United States Patent [19]

Blackmore et al.

[11] Patent Number: 5,606,997
[45] Date of Patent: Mar. 4, 1997

[54] METHOD FOR REHABILITATING PIPE LINE AND RESIN IMPREGNATED LINING HAVING AN INTEGRAL HEATING ELEMENT

[75] Inventors: Richard D. Blackmore, Northbrook, Ill.; Mark T. Sloan, Rahleigh, N.C.

[73] Assignee: Advance Trenchless Rehabilitation Systems, Arlington Heights, Ill.

[21] Appl. No.: 430,330

[22] Filed: Apr. 28, 1995

[51] Int. Cl.⁶ .............................. B29C 63/28; B29C 63/34
[52] U.S. Cl. .............................. 138/98; 138/97; 264/449; 264/36; 156/287
[58] Field of Search ............. 138/97, 98; 264/449, 264/269, 516, 27, 36; 156/94, 287, 294, 95

[56] References Cited

U.S. PATENT DOCUMENTS

| | | |
|---|---|---|
| 1,960,120 | 5/1934 | Mohring . |
| 2,458,864 | 1/1949 | Lindsay . |
| 3,346,442 | 10/1967 | Carmody . |
| 3,390,951 | 7/1968 | Finger et al. . |
| 3,962,394 | 6/1976 | Hall . |
| 4,009,063 | 2/1977 | Wood ................................ 138/97 X |
| 4,385,957 | 5/1983 | Wackerle et al. . |
| 4,510,219 | 4/1985 | Rowlette . |
| 4,568,592 | 2/1986 | Kawaguchi et al. . |
| 4,609,449 | 9/1986 | Morin . |
| 4,624,751 | 11/1986 | Morin et al. . |
| 4,661,403 | 4/1987 | Morin . |
| 4,668,545 | 5/1987 | Lowe . |
| 4,708,527 | 11/1987 | Inhofe, Jr. et al. . |
| 4,838,971 | 6/1989 | Cacak . |
| 4,861,634 | 8/1989 | Renard . |
| 4,874,454 | 10/1989 | Talalay et al. . |
| 4,874,548 | 10/1989 | Hajovsky . |
| 4,904,351 | 2/1990 | Morin . |
| 4,909,910 | 3/1990 | Morin . |
| 4,966,729 | 10/1990 | Carmona et al. . |
| 4,980,008 | 12/1990 | Woods et al. . |
| 4,994,518 | 2/1991 | Morin et al. . |
| 4,995,761 | 2/1991 | Barton . |
| 4,997,511 | 3/1991 | Newsom . |
| 5,010,440 | 4/1991 | Endo ................................ 138/97 X |
| 5,027,575 | 7/1991 | Owen . |
| 5,043,033 | 8/1991 | Fyfe . |
| 5,182,134 | 1/1993 | Sato . |
| 5,199,463 | 4/1993 | Lippiatt . |
| 5,248,864 | 9/1993 | Kodokian . |
| 5,286,417 | 2/1994 | Mahmoud et al. . |
| 5,326,410 | 7/1994 | Boyles . |
| 5,326,636 | 7/1994 | Durand et al. . |
| 5,451,351 | 9/1995 | Blackmore . |
| 5,490,744 | 2/1996 | McNeil ................................ 138/97 X |
| 5,490,964 | 2/1996 | Kamiyama et al. ............. 138/97 X |

FOREIGN PATENT DOCUMENTS

| | | |
|---|---|---|
| A0173446 | 3/1986 | European Pat. Off. . |
| A0378232 | 12/1989 | European Pat. Off. . |
| 605085 | 7/1994 | European Pat. Off. . |
| 56-67217 | 6/1981 | Japan . |
| 61-18920 | 5/1986 | Japan . |
| 158323 | 6/1990 | Japan . |
| 150334 | 6/1990 | Japan . |
| 3-212568 | 9/1991 | Japan . |
| 109194 | 4/1994 | Japan . |
| 945911 | 1/1964 | United Kingdom . |
| WO85/03906 | 12/1985 | WIPO . |
| WO93/0641 | 4/1993 | WIPO . |

Primary Examiner—Patrick Brinson
Attorney, Agent, or Firm—Wallenstein & Wagner, Ltd.

[57] ABSTRACT

A method and lining for rehabilitating a pipe or conduit. The method comprising providing a heat curable resin impregnated lining with first and second conductive strips extending lengthwise through the lining from a first end to a second end and separated circumferentially by non-conductive material. Connecting the conductive strips together at said second end and causing a current to flow through said first conductive layer from said first end to said second end of said lining, and through said second conductive lining from said second end to said first end. The lining having a plurality of conductive strips extending lengthwise through the lining.

9 Claims, 3 Drawing Sheets

METHOD FOR REHABILITATING PIPE LINE AND RESIN IMPREGNATED LINING HAVING AN INTEGRAL HEATING ELEMENT

DESCRIPTION

TECHNICAL FIELD

The present invention generally relates to a method and a lining for rehabilitating pipe lines and other conduits, and more particularly to a method of rehabilitating a pipe using a lining impregnated with a heat activated curable resin system and which includes an integral electrically resistive conductive element which can be connected to an electrical power source at one end of the lining only.

BACKGROUND OF THE INVENTION

Various methods exist for rehabilitating damaged pipe lines and other conduits. These methods range from physically removing the damaged section of the pipe or conduit and replacing it with a new section, to providing a reinforced lining for the pipe or conduit.

Reinforced linings are typically formed from composite materials and are impregnated on site, or pre-impregnated at a remote location, with a curable resin system. When the resin system cures, it hardens and forms a protective shell in the pipe or conduit.

There are generally two types of resins systems which may be used in such linings, ambient cure systems and heat activated systems. Ambient cure systems can experience many problems in pipe rehabilitation. For example, if the temperature is too cold, which may occur in underground sewer pipes, the resin will not cure and the lining will collapse unless it retains some internal support structure. Conversely, on warm days, the system may begin to cure before the lining is properly placed in the pipe. Accordingly, high temperature activated resin systems are preferred.

High temperature resin systems require a heating element to activate the resin system once the lining is in place in the pipe or conduit. In the past, heated water, steam or gas was circulated in the lining to cure the resin. These operations required expensive equipment, and typically took a long period of time to ensure a proper cure.

Another method of heating a composite lining was to place a heating element directly into the composite material. The heating element could take the form of a conductive element, such as a layer of conductive fibers in the lining. The lining was positioned in the pipe or conduit and then inflated to press against the walls of the pipe or conduit. An electric power source connected at both ends of the lining would cause an electric current to flow from one end of the lining to the other end to resistively heat the conductive layer to cure the resin. Graphite fabric was sometimes used as the conductive layer.

Such systems were able to obtain the benefits of having the current run lengthwise through the lining, but required providing electrical connections at both ends of the lining. Depending on the structure and location of the pipe being rehabilitated, it is sometimes difficult or impossible to place a cable at the far end of the lining to complete the electrical circuit. Additionally, even if possible to place the cable at the far end of the lining, it may require an extremely long cable to do so which is undesirable. Finally, when access to the far end of the lining is through a manhole located on a street, it may become necessary to close the street to effect the repair.

U.S. Pat. No. 4,768,562 (Strand) discloses another method of rehabilitating a pipe with a lining having an integral heating element. Strand discloses pulling an elastomeric tube through a damaged pipe. The elastomeric tube has a diameter substantially equal to the inner diameter of the pipe and is encompassed by an electrically conductive resinated fiber lattice that radially contracts when axially elongated. The elastomeric tube and resinated fiber lattice are axially tensioned, whereby the maximum diameter of the liner is elastically reduced by the resultant elongation thereof. The resin is then partially polymerized so that the liner is maintained in such condition. After being pulled through the pipe, an electric current is directed through the resinated fiber lattice, thus softening the resin by electrical resistance heating. The elastomeric tube, no longer restrained by the resinated fibre lattice, resiliently expands radially outwardly until it resumes its prior shape. The liner is further heated electronically so as to completely polymerize the resin, thereby bonding the liner to the inner wall of the damaged pipe.

U.S. Pat. No. 5,010,440 (Endo), discloses another method of rehabilitating a pipe with a lining having an integral heating element. Endo discloses a lining constructed having a tubular conductive layer. Copper wires are affixed lengthwise on the lining by means of strips of insulating tape which are coated with an adhesive material on one side. The copper wires are affixed along the edges of the lining before it is formed into a tubular shape as shown in FIG. 2(a) of Endo. Although the edges of the lining are brought into contact with each other, they are electrically insulated from each other by means of the insulating tape. This places the copper wires physically close to each other in the lining. The copper wires are used to cause an electric current to flow circumferentially through the lining.

Contrary to the approach taken by Endo, the methods of the present claims cause a current to flow lengthwise through the lining as opposed to circumferentially. A more thorough and faster cure is affected by causing the current to run lengthwise through the lining.

Further, the present methods reduce or eliminate potential problems faced by Endo. For instance, ripping or tearing of the insulating tape during placement of the Endo lining in a pipe may result in a short circuit, which may interfere with proper heating and curing of the resin. Additionally, the Endo linings may require a large current, and such large currents may themselves create problems. These problems are not encountered utilizing the methods of the present invention.

SUMMARY OF THE INVENTION

The present invention is a method of rehabilitating a pipe or conduit with a resin impregnated lining having an internal heating element. The method comprises providing a tubular composite lining having a first end and a second end. The lining is impregnated with a heat activated curable resin. The lining includes at least a first strip of conductive material, such as graphite fabric or uni-directional graphite, which extends longitudinally from the first end to the second end of the lining, and at least a second strip of conductive material also extending from the first end to the second end of the lining. The second conductive strip is spaced circumferentially from the first conductive strip by non-conductive material in the lining.

The method further includes connecting the first conductive strip to the second conductive strip at the second end of the lining to create electrical continuity between the first conductive strip and the second conductive strip at the second end of the lining. This can be accomplished by aligning the conductive strips and by stitching the second end together. The lining is positioned inside a pipe to be rehabilitated and is inflated to compress the lining against an inner wall of the pipe. An electric current is caused to flow through the first conductive strip from the first end to the second end of the lining, and through the second conductive strip from the second end to the first end to resistively heat the lining to cure the impregnated resin.

A source of electrical power, such as a generator, is provided having a first electrically conductive lead, or cable, and a second electrically conductive lead, or cable. The first electrically conductive lead is connected to the first conductive strip in the lining at the first end of the lining. The second electrically conductive lead is connected to the second conductive strip in the lining at the first end of the lining to create an electrical circuit with the source of electrical power longitudinally through the first conductive strip of the lining from the first end to the second end and back from the second end through the second conductive strip to the first end.

A plurality of pairs of conductive strips can also be utilized in the same manner. For example, the lining may include a third conductive strip extending longitudinally from the first end of the lining to the second end circumferentially separated from the first and second strips by non-conductive material in the lining, and a fourth conductive strip extending longitudinally from the first end of the lining to the second end also circumferentially separated from the first, second and third strips by non-conductive material in the lining. The third strip to would then be connected to the fourth strip at the second end of the lining in the same manner as the first and second conductive strips. An electric current would then be caused to flow through the third conductive strip from the first end of the lining to the second end of the lining and through the fourth conductive strip from the second end to the first end of the lining to resistively heat the lining to cure said impregnated resin. The conductive strips can be made of sufficient width to substantially resistively heat the entire tubular lining.

The lining is inflated against the pipe or conduit with an inflatable and expandable bladder positioned inside the liner. Alternatively, the bladder may be formed as an integral part of the lining. Air, from a compressor can be used to inflate the bladder.

After the cure is affected, a remote cutter can be utilized to cut open the second end of the lining.

In the present system the electrical current flows lengthwise, or longitudinally, from a first end of the lining to a second end, and then lengthwise, or longitudinally back from said second end to said first end. In this manner, electrical connections to the lining from a power source can be made at one end of the lining.

The heat curable resin in the lining of the present invention may be an epoxy, a cyanate ester, a polyester, a vinyl ester, a polyurethane, or a blend. One blend is an organic peroxide catalyzed isopolyester gelled with urethane including a propoxylated bisphenol-A, a diphenylmethane, a diisocyanate and a dibutyltin dilaurate catalyst. Other curable resins include Dow Chemical's vinyl ester #411–700, BASF polyurethane #606, Reichhold Chemical's epoxy #37–137 catalyzed with Henkel #607, and Shell Chemical's epoxy #8132 catalyzed with Henkel #607.

Preferably, the curable resin exotherms in the range of 200 to 400 degrees F. More preferably, the curable resin exotherms at about 300 degrees F. By "exotherm," it is meant the temperature that the resin will rise to upon initiation and subsequent curing.

Further aspects of the invention are described in the detailed description or shown in the Figures.

DETAILED DESCRIPTION OF PREFERRED EMBODIMENTS

Figure 1:
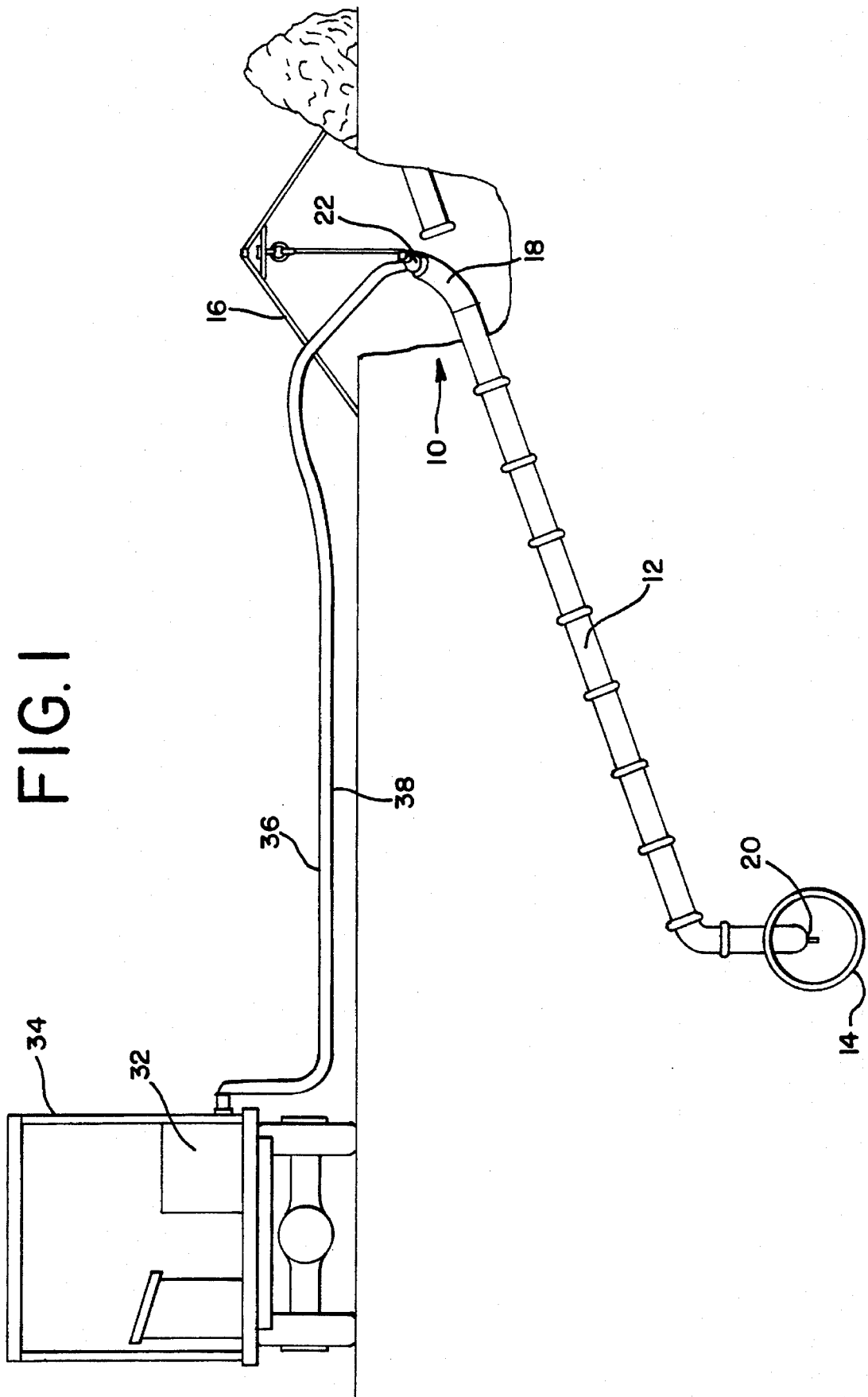
FIG. 1 discloses a perspective view of the lining of the present invention for rehabilitating a pipeline.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

As disclosed in FIG. 1, a composite lining 10 of the present invention is used to rehabilitate a section of pipe 12 which runs underground to a main sewer line 14. The ground at one end of the pipe 12 has been excavated to allow access to the pipe 12. A winch, or support 16, is set up over the evacuated area and is connected to the lining at a first end 18 to hold the first end 18 in place.

The lining 10 may be pulled into place in the pipe 12 by attaching a line or cable to a second end 20 of the lining 10, and pulling it through the pipe 12. Alternatively, the lining 10 may be positioned in the pipe 12 by inversion whereby the lining 10 is turned inside out and is forced into the pipe 12 under fluid pressure. This method causes the liner 10 to reinvert as it moves down the pipe 12. Such placement techniques are well known in the art.

As shown extending into the sewer 14, the second end 20 of the lining 10 is sewn together. An air compressor (not shown) is used to inflate the liner 10 against the inner walls of the pipe 12 in a conventional manner.

In the preferred form, the liner 10 includes a plurality of conductive fiber bundles or strips 24 which extend lengthwise or longitudinally from the first end 18 of the liner 10 to the second end 20 of the liner 10. The strips 24 are separated from adjacent strips by non-electrically conductive material 26. When formed into a tubular form, the strips 24 are separated circumferentially along the lining 10. Preferably the strips 24 are uni-directional graphite fibers or a graphite fabric (either woven or non-woven), however other conductive materials, such as conductive polymer coated fibers, can be used. The conductive strips 24 are preferably separated by non-conductive fiberglass.

Figure 4:
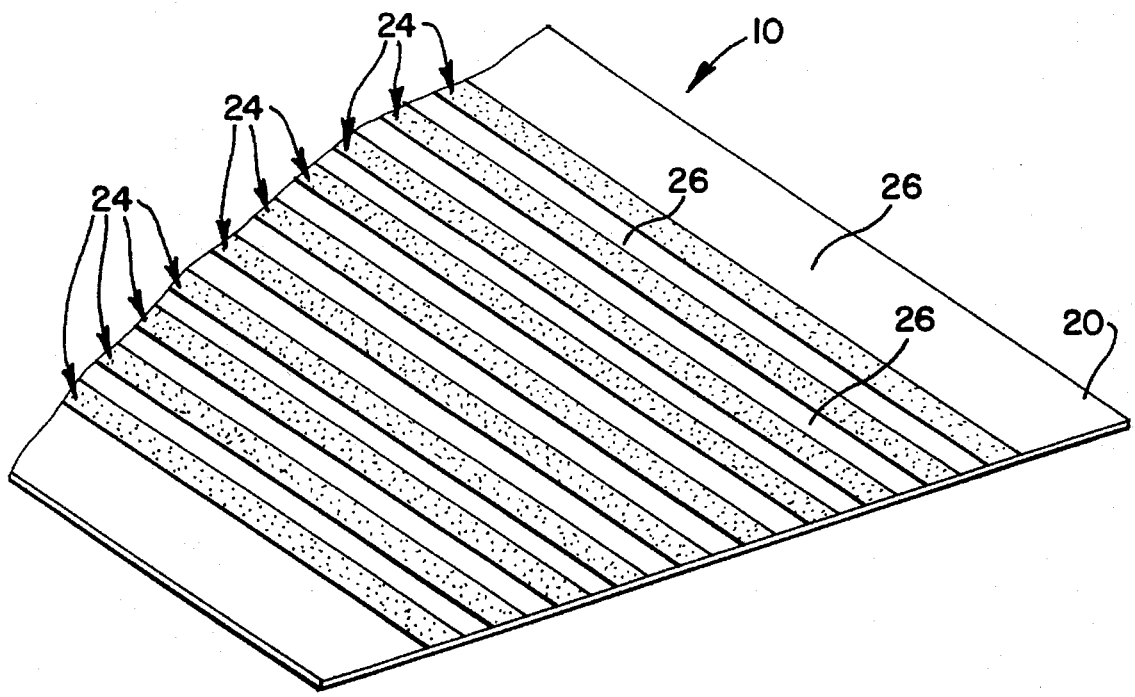
FIG. 4 discloses a partial perspective view of the lining of the present invention laid open prior to stitching or sewing the lining into a tubular form.

FIG. 4 discloses a liner 10 in a laid open state prior to forming the liner 10 into a tubular form. The liner includes ten strips 24 of conductive uni-directional graphite separated by non-conductive fiberglass 26.

Although FIG. 4 discloses ten conductive strips, the liner 10 can be used with a fewer or greater number of strips 24. However, there must be at least two strips 24 to create an electrical circuit lengthwise through the lining 10 as discussed herein. In such instances, the width of the strips 24 would be adjusted to ensure that the entire lining 10 is substantially heated to the cure temperature as explained below.

Figure 5:
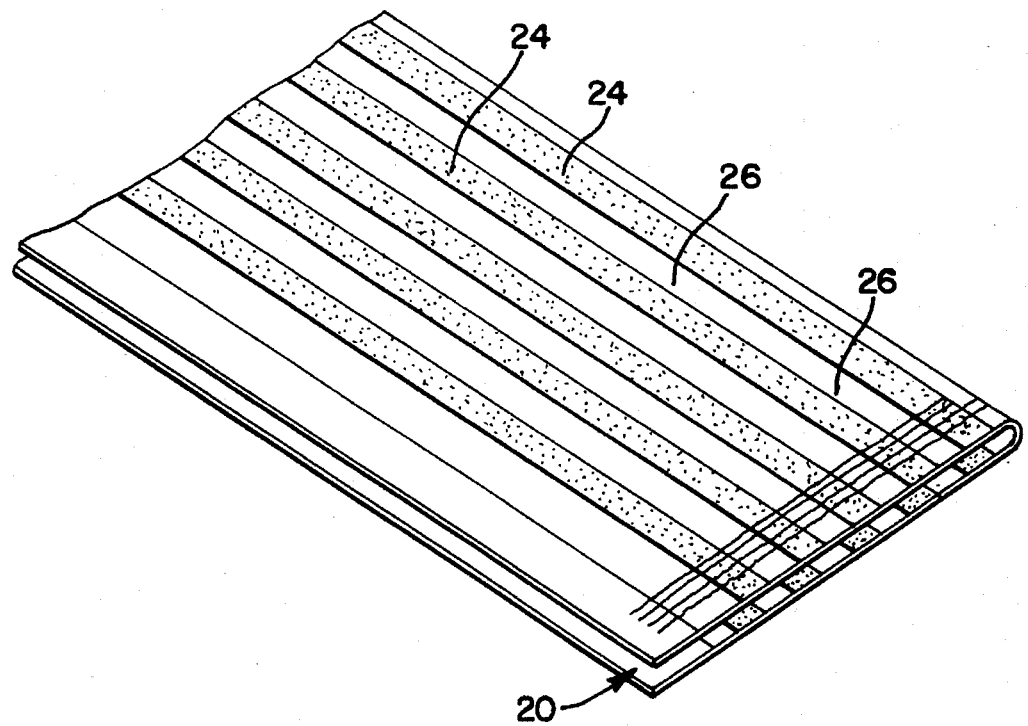
FIG. 5 discloses a partial perspective view of the lining of FIG. 4 folded in half longitudinally.

FIG. 5 discloses the lining 10 of FIG. 4 folded lengthwise so that a first side 28 of the lining is brought into contact with an opposing second side 30 of the lining 10. The first and second sides 28,30 of the lining 10 are then stitched together to construct the tubular form.

As also shown in FIG. 5, the second end 20 of the lining 10 is stitched together. This is done in such a manner as to bring each of the conductive strips 24 into alignment with another conductive strip 24 to form pairs of strips 24. The strips 24 are stitched together to allow for electrical continuity between each aligned pair at the second end 20 of the lining 10. Additionally, an electrically conductive strip (not shown) can be placed across the ends of the conductive strips 24, and can be stitched into place to help ensure electrical continuity between the pairs of conductive strips.

Referring to FIG. 1, an electrical power source 32, such as a generator, is connected to the lining 10 only at its first end 18. The power source 32, shown inside a serviceman's truck 34, includes a first electrical lead, or cable 36, and second electrical lead, or cable 38. The first lead 36 is connected to one half of the conductive strips 24 (for example, the first five strips 24) at the first end 18 of the lining 10, and the second lead 38 is connected to the remaining conductive strips 24 (the second five strips 24) to create an electric circuit through the lining 10.

The power source 32 is activated to generate a sufficient electric current through the lining 10 to resistively heat the lining 10 to cure a heat activated thermosetting resin impregnated in the lining 10. It has been found that 0.5–1 amps per bundle of conductive fibers is sufficient to cure the preferred resin system. Alternatively, producing 5 volts per foot (lengthwise) of the lining is also sufficient.

The current travels from the first lead 36 to the first end 18 of the lining 10, and longitudinally down the lining 10 through the strips 24 connected to the first lead 36, to the second end 20 of the lining 10. The current then travels longitudinally from the second end 20 of the lining 10 to the first end 18 of the lining 10 through the strips 24 connected to the second lead 38. The current travels through the second lead 38 to the power source 32 to complete the circuit.

Figure 2:
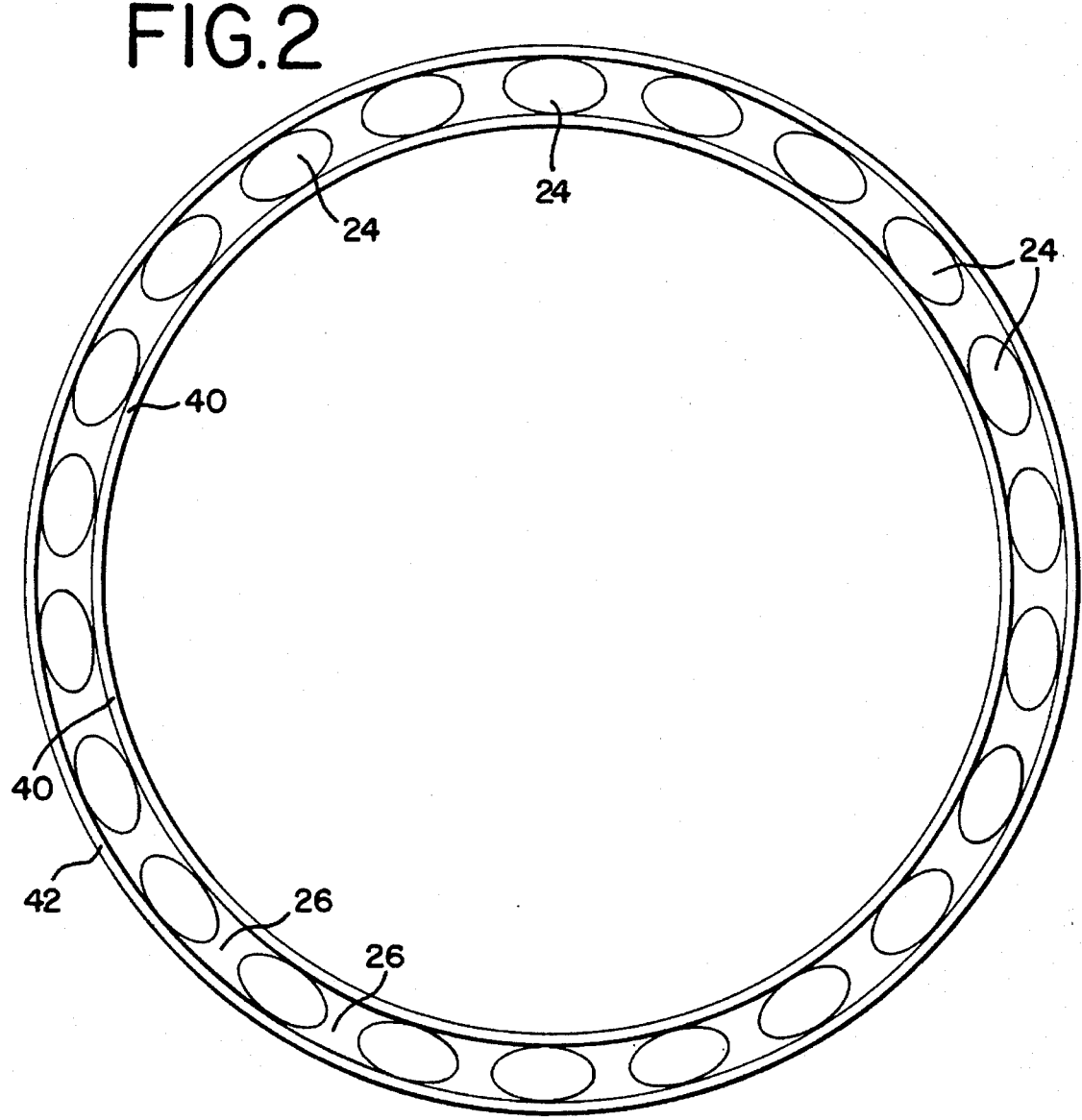
FIG. 2 discloses a cross-section of the lining of the present invention in an inflated state.
Figure 3:
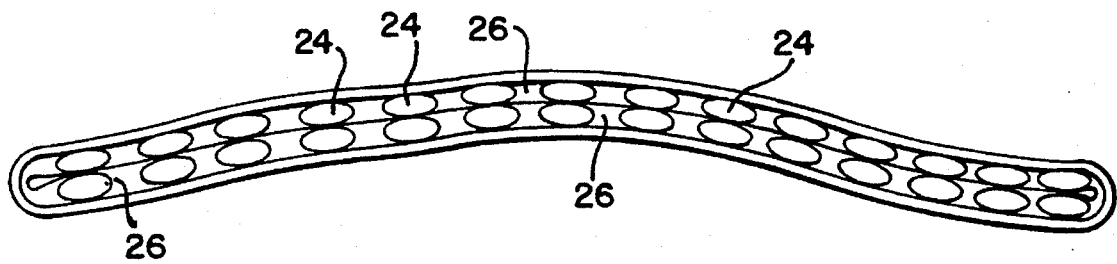
FIG. 3 discloses a cross-section of the lining of the present invention in a deflated state.

An expandable inflatable bladder 40, shown inflated in FIG. 2, and deflated in FIG. 3, is used to compress the lining 10 against the inner wall of the pipe 12. The bladder 40 may be a separate element, or it may be integrally formed as part of the composite. The bladder 40 is preferably a methylvinylpolysiloxane or polytetrafluoroethylene film.

The outer surface of the lining 10 may include a temporary protective layer 42 of low melt polyester or polyethylene. The protective layer melts into the lining upon curing. The protective layer prevents snagging of the lining 10 during placement in the pipe 12.

One preferred resin system for pre-impregnating (prepreg) the composite lining 10 includes saturating the lining with an isopolyester resin base catalyzed with 1% by weight perkadox 16 organic peroxide percarbonate from Akzo Chemicals and with 1% by weight trigonox 29-B75 organic peroxide from Akzo Chemicals. This catalyzed material constitutes an A-staged prepreg having a shelf-life of 7–9 days.

To enhance shelf-life and workability, the A-staged prepreg is gelled by adding a urethane additive including 6% by weight of the A-staged material of 46550 propoxylated bisphenol-A from Reichhold Chemicals, 8% by weight M1780 diphenylmethane-diisocyanate from ICI Polyurethanes group, and 0.8% by weight of T12 dibutyltin dilaurate catalyst from Air Products & Chemicals, Inc. The urethane modified A-staged material gels to become a B-staged prepreg having a shelf-life of around 1 month. The lining 10 is impregnated and saturated with the B-staged, gelled resin.

An alternative form of the lining can be prepared by needle punching strips of graphite fabric onto a sheet of polyester or other non-conductive fabric. Additional layers of fabric, such as polyester or kevlar, may also be added to the lining 10 to provide increased strength.

After the resin is sufficiently cured or hardened, a remote cutter (not shown) can be utilized to cut an opening in the second end 20 of the lining.

While specific embodiments have been illustrated and described, numerous modifications come to mind without markedly departing from the spirit of the invention. The scope of protection is thus only intended to be limited by the scope of the accompanying claims.

What we claim is:

1. A method of rehabilitating a pipe comprising the steps of:

providing a tubular composite lining having a first end and a second end and impregnated with a heat activated curable resin, said lining including a first strip of conductive material extending longitudinally from said first end to said second end of said lining, and a second strip of conductive material extending from said first end to said second end of said lining spaced circumferentially from said first conductive strip by non-conductive material;

connecting said first conductive strip to said second conductive strip at said second end of said lining;

positioning said lining inside a pipe to be rehabilitated;

inflating said lining to compress said lining against an inner wall of said pipe; and causing an electric current to flow through said first conductive strip from said first end to said second end of said lining and through said second conductive strip from said second end to said first end of said lining to resistively heat said lining to cure said impregnated resin.

2. The method of claim 1 wherein said causing an electric current step comprises:

providing a source of electrical power having a first electrically conductive lead and a second electrically conductive lead;

connecting said first electrically conductive lead to said first conductive strip in said lining at said first end of said lining; and connecting said second electrically conductive lead to said second conductive strip in said lining at said first end of said lining.

3. The method of claim 1 further comprising the steps of:

providing a third conductive strip extending longitudinally from said first end of said lining to said second end and circumferentially separated from said first and second strips by non-conductive material in said lining;

providing a fourth conductive strip extending longitudinally from said first end of said lining to said second end and circumferentially separated from said first, second and third strips by non-conductive material in the lining, connecting said third strip to said fourth strip at said second end of said lining; and causing an electric current to flow through said third conductive strip from said first end to said second end of said lining and through said fourth conductive strip from said second end to said first end of said lining to resistively heat said lining to cure said impregnated resin.

4. The method of claim 1 where in said inflating step comprises:

positioning an inflatable bladder within said tubular lining; and forcing air into said bladder to inflate said bladder.

5. The method of claim 1 further the comprising the step of cutting an opening through said second end of said lining after the resin has sufficiently cured.

6. A method of rehabilitating a pipe comprising the steps of:

providing a tubular composite lining having a first end and a second end and impregnated with a heat activated curable resin, said lining including a first strip of conductive graphite fabric extending longitudinally from said first end to said second end of said lining, and a second strip of conductive graphite fabric extending from said first end to said second end of said lining spaced circumferentially from said first strip of graphite fabric by non-conductive fiberglass;

stitching said first strip of graphite fabric to said second strip of graphite fabric at said second end of said lining;

positioning said lining inside a pipe to be rehabilitated;

inflating said lining to compress said lining against an inner wall of said pipe; and providing a source of electrical power having a first electrically conductive lead and a second electrically conductive lead;

connecting said first electrically conductive lead to said first strip of graphite fabric in said lining at said first end of said lining; and connecting said second electrically conductive lead to said second strip of graphite fabric in said lining at said first end of said lining causing an electric current to flow through said first strip of graphite fabric from said first end to said second end of said lining and through said second strip of graphite fabric from said second end to said first end of said lining to electrically resistively heat said lining to cure said impregnated resin.

7. The method of claim 6 further comprising the steps of:

providing a third strip of conductive graphite fabric extending longitudinally from said first end of said lining to said second end and circumferentially separated from said first and second strips of graphite fabric by non-conductive fiberglass in said lining;

providing a fourth conductive strip of graphite fabric extending longitudinally from said first end of said lining to said second end and circumferentially separated from said first, second and third strips of graphite fabric by non-conductive fiberglass in the lining, connecting said third strip of graphite fabric to said fourth strip of graphite fabric at said second end of said lining; and causing an electric current to flow through said third strip of graphite fabric from said first end to said second end of said lining and through said fourth strip of graphite fabric from said second end to said first end of said lining to resistively heat said lining to cure said impregnated resin.

8. The method of claim 6 where in said inflating step comprises:

positioning an inflatable bladder within said tubular lining; and forcing air into said bladder to inflate said bladder.

9. The method of claim 6 further comprising cutting an opening through the second end of said lining after the resin has sufficiently cured.

* * * * *